US007774398B2

(12) United States Patent
Cioffi et al.

(10) Patent No.: US 7,774,398 B2
(45) Date of Patent: Aug. 10, 2010

(54) TONAL ROTORS

(75) Inventors: John M. Cioffi, Atherton, CA (US); Iker Almandoz, Palo Alto, CA (US); Georgios Ginis, San Francisco, CA (US)

(73) Assignee: Adaptive Spectrum And Signal Alignment, Inc., Redwood, CA (US)

( * ) Notice: Subject to any disclaimer, the term of this patent is extended or adjusted under 35 U.S.C. 154(b) by 1163 days.

(21) Appl. No.: 11/284,692

(22) Filed: Nov. 22, 2005

(65) Prior Publication Data

US 2006/0259535 A1     Nov. 16, 2006

Related U.S. Application Data

(60) Provisional application No. 60/679,621, filed on May 10, 2005, provisional application No. 60/698,113, filed on Jul. 10, 2005.

(51) Int. Cl.
  *G06F 7/52*   (2006.01)
  *G06F 17/14*  (2006.01)
  *G06F 7/38*   (2006.01)
  *H03D 1/04*   (2006.01)

(52) U.S. Cl. ........................ 708/607; 708/404; 708/235; 375/346

(58) Field of Classification Search .................. 708/607; 345/473; 375/260–262
See application file for complete search history.

(56) References Cited

U.S. PATENT DOCUMENTS

| | | | |
|---|---|---|---|
| 5,181,198 A | | 1/1993 | Lechleider |
| 5,319,674 A | * | 6/1994 | Cherubini .................... 375/232 |
| 5,511,119 A | | 4/1996 | Lechleider |
| 5,621,768 A | | 4/1997 | Lechleider |
| 5,901,205 A | | 5/1999 | Smith et al. |
| 6,134,273 A | * | 10/2000 | Wu et al. .................... 375/261 |
| 6,147,963 A | | 11/2000 | Walker et al. |

(Continued)

FOREIGN PATENT DOCUMENTS

DE        4444312         2/1996

(Continued)

OTHER PUBLICATIONS

Franklin, Curt. "How DSL Works." Aug. 7, 2000. HowStuffWorks. com. <http://www.howstuffworks.com/dsl.htm> Jun. 30, 2009.*

(Continued)

*Primary Examiner*—Lewis A Bullock, Jr.
*Assistant Examiner*—Kevin Hughes
(74) *Attorney, Agent, or Firm*—Blakely, Sokoloff, Taylor & Zafman, LLP

(57) ABSTRACT

A set of complex rotations are used to implement a unitary "Q" matrix in which each complex rotation is a set of real rotations, where the minimum number of real rotations to perform the complex rotation is three, and where the minimum number of angles to characterize the real rotations is two. The index-angle sets for each successive rotation can be provided by a complex rotor calculation unit, which may be collocated with the complex rotor computational unit, located in a controller such as a DSL optimizer, or located in any other suitable device or apparatus that has performed the QR factorization upon supplied matrix MIMO transfer functions for the vectored channel.

20 Claims, 9 Drawing Sheets

U.S. PATENT DOCUMENTS

| | | | |
|---|---|---|---|
| 6,359,923 B1* | 3/2002 | Agee et al. | 375/130 |
| 6,507,608 B1 | 1/2003 | Norrell | |
| 6,778,505 B1* | 8/2004 | Bullman et al. | 370/254 |
| 6,940,973 B1 | 9/2005 | Yeap et al. | |
| 7,158,563 B2* | 1/2007 | Ginis et al. | 375/224 |
| 2003/0081741 A1* | 5/2003 | Anne et al. | 379/93.01 |
| 2003/0086514 A1 | 5/2003 | Ginis et al. | |
| 2004/0086064 A1 | 5/2004 | Van Acker et al. | |
| 2004/0120411 A1* | 6/2004 | Walton et al. | 375/260 |
| 2005/0053229 A1 | 3/2005 | Tsatsanis et al. | |
| 2005/0129218 A1 | 6/2005 | Kimble et al. | |
| 2005/0152385 A1 | 7/2005 | Cioffi | |
| 2006/0109779 A1 | 5/2006 | Shah et al. | |
| 2006/0133519 A1 | 6/2006 | Tsatsanis et al. | |
| 2006/0146945 A1 | 7/2006 | Chow et al. | |
| 2006/0173948 A1* | 8/2006 | Krawiec et al. | 708/607 |

FOREIGN PATENT DOCUMENTS

| | | |
|---|---|---|
| GB | 2315392 | 1/1998 |
| WO | WO-95/31867 | 11/1995 |
| WO | WO-01/35611 | 5/2001 |
| WO | WO 03/105339 A1 | 7/2001 |
| WO | WO-2004027579 | 4/2004 |
| WO | WO-2005094052 | 10/2005 |

OTHER PUBLICATIONS

Yi Jiang, Student Member, IEEE, Jian Li, Fellow, IEEE, and William W. Hager, "Joint Transceiver Design for MIMO Communications Using Geometric Mean Decomposition", IEEE Transactions on Signal Processing, vol. 53, No. 10, Oct. 2005, p. 3791-3803.*

Geert Ysebaert, Koen Vanbleu, Gert Cuypers, Marc Moonen, and Thierry Pollet, "Combined RLS-LMS Initialization for Per Tone Equalizers in DMT-Receivers", IEEE Transactions on Signal Processing, vol. 51, No. 7, Jul. 2003, p. 1916-1927.*

G. Lightbody, R. Walke., R. Woods and J. McCanny, "Novel Mapping of a Linear QR Architecture", 0-7803-5041-3/99 1999 IEEE, p. 1933-1936.*

International Search Report, Intl. App. No. PCT/IB2006/000499 (4 pgs).

Written Opinion of the International Searching Authority, International Application No. PCT/IB2006/000499 (6 pgs).

Cendrillon et al., "The Linear Zero-Forcing Crosstalk Canceller is Near-optimal in DSL Channels," IEEE Global Communications Conference (Globecom); Dallas, Texas; Dec. 2004 (5 pgs).

Cendrillon et al., "Improved Linear Crosstalk Precompensation for DSL," IEEE International Conference on Acoustics, Speech and Signal Processing (ICASSP); Sep. 2004 (4 pgs).

Forouzan et al., "Generalized Iterative Spectrum Balancing And Grouped Vectoring For Maximal Throughput Of Digital Subscriber Lines," Globecom 2005; St. Louis, Missouri; Nov. 28 -Dec. 2, 2005 (5 pgs).

Cendrillon et al., "Partial Crosstalk Cancellation Exploiting Line and Tone Selection in Upstream VDSL," Baiona Workshop on Signal Processing in Communications; Baiona, Spain; Sep. 2003 (6 pgs).

Cuypers et al., "Combining Per Tone equalization and windowing in DMT receivers," IEEE International Conference on Acoustics, Speech and Signal Processing (ICASSP), Orlando, Florida, May 2002 (4 pgs).

Song et al., "Dynamic Spectrum Management for Next Generation DSL Systems," IEEE Communications Magazine, vol. 20, No. 10, pp. 101-109, Oct. 2002 (9 pgs).

Starr et al., "DSL Advances," Chaps. 3, 7 & 11; Prentice-Hall, 2003 (173 pgs).

Cheong et al., "Computationally Efficient Cancellation of Partially-overlapped Crosstalk in Digital Subscriber Lines," Globecom 2005; St. Louis, Missouri; Nov. 28-Dec. 2, 2005 (5 pgs).

Cendrillon et al., "Partial Crosstalk Precompensation for Downstream VDSL," Published by Elsevier North-Holland, Inc.; vol. 84, Issue 11; Nov. 2004; ISSN:0165-1684 (15 pgs).

Cendrillon et al., "Partial Crosstalk Cancellation for Upstream VDSL," EURASIP Journal on Applied Signal Processing; Oct. 2004 (16 pgs).

Ginis et al., "Vectored Transmission for Digital Subscriber Line Systems," IEEE Jour. on Sel. Areas in Communications; vol. 20, No. 5; Jun. 2002 (20 pgs).

Cuypers et al., "Combined Per Tone equalization and receiver windowing in DSL receivers; WiPTEQ," Signal Processing, Elsevier Science Publishers; vol. 85, No. 10; Oct. 2005 (22 pgs).

Otte et al., "Complex CORDIC-like Algorithms for Linearly Constrained MVDR Beamforming," Broadband Communications; 2000 Proceedings; Zurich, Switzerland; Feb. 15-17, 2000 (21 pgs).

Cioffi, "The Fast Adaptive Rotor's RLS Algorithm," IEEE Transactions on Acoustics, Speech & Signal Processing; vol. 38, No. 4; Apr. 1, 1990 (23 pgs).

"International Search Report and Written Opinion", PCT Application No. PCT/US2007/013393, (Jan. 4, 2008).

Ginis, George et al., "Vectored Transmission for Digital Subscriber Line Systems", *IEEE Journal*, vol. 20 No. 5, Piscataway, NJ, US., XP-011065493, (Jun. 5, 2002), pp. 1085-1104.

Patent Cooperation Treaty, "International Preliminary Report on Patentability and Written Opinion" *International Application* No. PCT/US2007/013393, 8 pgs.

Voyan Technology, "Vectoring Techniques for Multi-Line 10MDSL Systems".

Cioffi, John M., "Dynamic Spectrum Management".

Cioffi, John M., "Dynamic Spectrum Management Report".

Cioffi, John, et al., "MIMO Channel Measurement Test Plan", (Feb. 17, 2003).

Cioffi, John M., "Spectrum Management with Advancing DSLs".

Cioffi, John, et al., "Vectored VDSL (99-559)".

Ilani, Ishai , "Crosstalk Cancellation for Multi-Line G.shdsl Systems".

Im, Gi-Hong et al., "FEXT Cancellation for Multi-Carrier Transmission System", (Apr. 11, 2002).

Office Action for European Patent Application No. 06710514.8 mailed Jan. 20, 2009, 4 pgs.

Examination Report for European Application No. 07795837.9, mailed Apr. 1, 2009, 4 pgs.

Voyan Technology, "Vectoring Techniques for Multi-Line 10MDSL Systems," Committee T1-Telecommunications, Working Group T1E1.4 (DSL Access), Denver, CO (Aug. 19, 2002), 11 pgs.

Cioffi, John M., "Dynamic Spectrum Management," Dynamic Spectrum Management , Chapter 11 (Jun. 6, 2007) 53 pgs.

Cioffi, John M., "Dynamic Spectrum Management Report," Committee T1-Telecommunicaitons, Working Group NAI, Denver, CO (Apr. 19, 2005) 85 pgs.

Cioffi, John, et al., "MIMO Channel Measurement Test Plan," Committee T1-Telecommunications, Working group T1E1.4 (DSL Access), Newport Beach, CA (Feb. 17, 2003), 8 pgs.

Cioffi, John M., "Spectrum Management with Advancing DSLs," ETST TM6 Monterey (Nov. 27, 2000), 9 pgs.

Cioffi, John, et al., "Vectored VDSL (99-559)," TIEI.4:VDSL (Dec. 5, 1999), 10 pgs.

Ilani, Ishai , "Crosstalk Cancellation for Multi-Line G.shdsl Systems," Committee T1-Telecommunications, Working Group T1E1.4 (DSL Access), Westminster, CO (Aug. 19, 2002), 3 pgs.

Im, Gi-Hong et al., "FEXT Cancellation for Multi-Carrier Transmission System," Committee T1-Telecommunications, Working Group T1E1.4 (DSL Access), Atlanta, GA (Apr. 8, 2002), 8 pgs.

Cioffi, John M., et al., "Dynamic Spectrum Management", *A methodology for providing significantly higher broadband capacity to the users*, Telektronikk, (Apr. 2004), 12 pgs.

Cioffi, John M., "Dynamic Spectrum Management Report", *Committee T1—Telecommunications Working Group NAI*, San Francisco, California, (Feb. 21, 2005), 75 pgs.

Cioffi, John , et al., "MIMO Channel Measurement Test Plan", (Feb. 17, 2003).

Fang, Jeannie L., "Modeling and Characterization of Copper Access Systems", (May 31, 2002).

Lee, et al., "Binder MIMO Channels", *submitted to IEEE Journal on Selected Areas in Communications*, Reference No. XP-001143167, (Jun. 2002), 31 pgs.

Magesacher, et al., "Exploiting the Common-Mode Signal in xDSL", *Proc. 12th European Signal Processing Conference (EUSIPCO 2004)*, Vienna, Austria, Sep. 7-10, 2004., 4 pgs.

Patent Cooperation Treaty, "International Search Report and Written Opinion", *International Application* No. PCT/IB2006/000482, (May 18, 2006), 9 pgs.

Paul, Clayton R., "Analysis of Multiconductor Transmission Lines", *John Wiley & Sons*, Chapters 2 and 3, (1994), 46-186.

\* cited by examiner

TONAL ROTORS

CROSS-REFERENCE TO RELATED APPLICATIONS

This application claims the benefit of priority under 35 U.S.C. §119(e) of the following:

U.S. Provisional No. 60/679,621 filed on May 10, 2005, entitled TONAL ROTORS, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communication systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

In communications systems employing vectoring techniques, the signals of multiple lines are jointly processed. Joint signal processing may take place either at the transmitter or at the receiver, or at both the transmitter and at the receiver. It is typical for vector-related joint signal processing techniques to include a matrix operation where a signal vector is multiplied by a unitary matrix. When the signal vector dimensions and/or unitary matrix dimensions are large, then this matrix operation has a high processing cost.

Systems, methods and techniques that provide a lower processing cost and an easily implemented matrix operation would represent a significant advancement in the art. Also, systems, methods and techniques that that can be easily integrated with controller modules likewise would represent a significant advancement in the art.

BRIEF SUMMARY

Embodiments of the present invention utilize a set of complex rotations to implement a unitary "Q" matrix that can arise in various transmitters and/or receivers in communication line vectoring, recognizing the complex rotation is a set of real rotations, where the minimum number of real rotations to perform the complex rotation is three, and where the minimum number of angles to characterize the real rotations is two. An order of rotations is also provided, though the order, as will be appreciated by those skilled in the art, may be chosen from any that are available and the sequence of rotations will be apparent to those skilled in the art.

The present invention assists in the efficient implementation of any unitary "Q" matrix in a QR or other sophisticated matrix factorization (for example, like singular-value decomposition or MMSE-GDFE calculations as described in Chapter 5 of Digital Data Transmission by John M. Cioffi) that characterizes vector DMT DSLs and copper transmission systems (such as perhaps also 10 Gbps Ethernet transmission systems). A complex form of the so-called "Givens" implementation of the Q matrix is characterized in the invention in terms of a sequence of complex rotations that are implemented using a complex rotor computational unit. This complex rotor computational unit accepts a minimum of two real angles and a pair of integer indices for each of a set of successive complex rotor calculations and then implements the complex rotation as a series of a minimum of three real rotations with one real angle used twice and the other real angle used once, providing two complex outputs (that is, two rotated data entries from a data vector comprising indexed communication data) for two complex inputs (two original data entries from a data vector comprising indexed communication data). The index-angle sets for each successive rotation can be provided by a complex rotor calculation unit, which may be collocated with the complex rotor computational unit, located in a controller such as a DSL optimizer, or located in any other suitable device or apparatus that has performed the QR factorization upon supplied matrix multiple input-multiple output ("MIMO") transfer functions for the vectored channel.

Rotations that are deemed (on all angles) to be sufficiently close to zero in angle measure may be ignored by the complex rotor computational unit (or not provided by the complex rotor calculation unit or any controller controlling operation of the complex rotor calculation unit) to save computational complexity, which enables the designer of an implementation to gauge the number of implemented rotations to the cost of implementation. The Q (or Q*) matrix can be updated by the complex rotor calculation unit (for example, in a DSL optimizer or other controller in a DSL or other communication system), recognizing that local updates (that is, updates performed within a modem or other communication line device) typically are complicated and limited by computational error. In such cases, the overall order of rotation may be best decided by a search procedure that is implemented centrally with the cost shared by the various lines serviced by the complex rotor calculation unit, controller and/or DSL optimizer.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
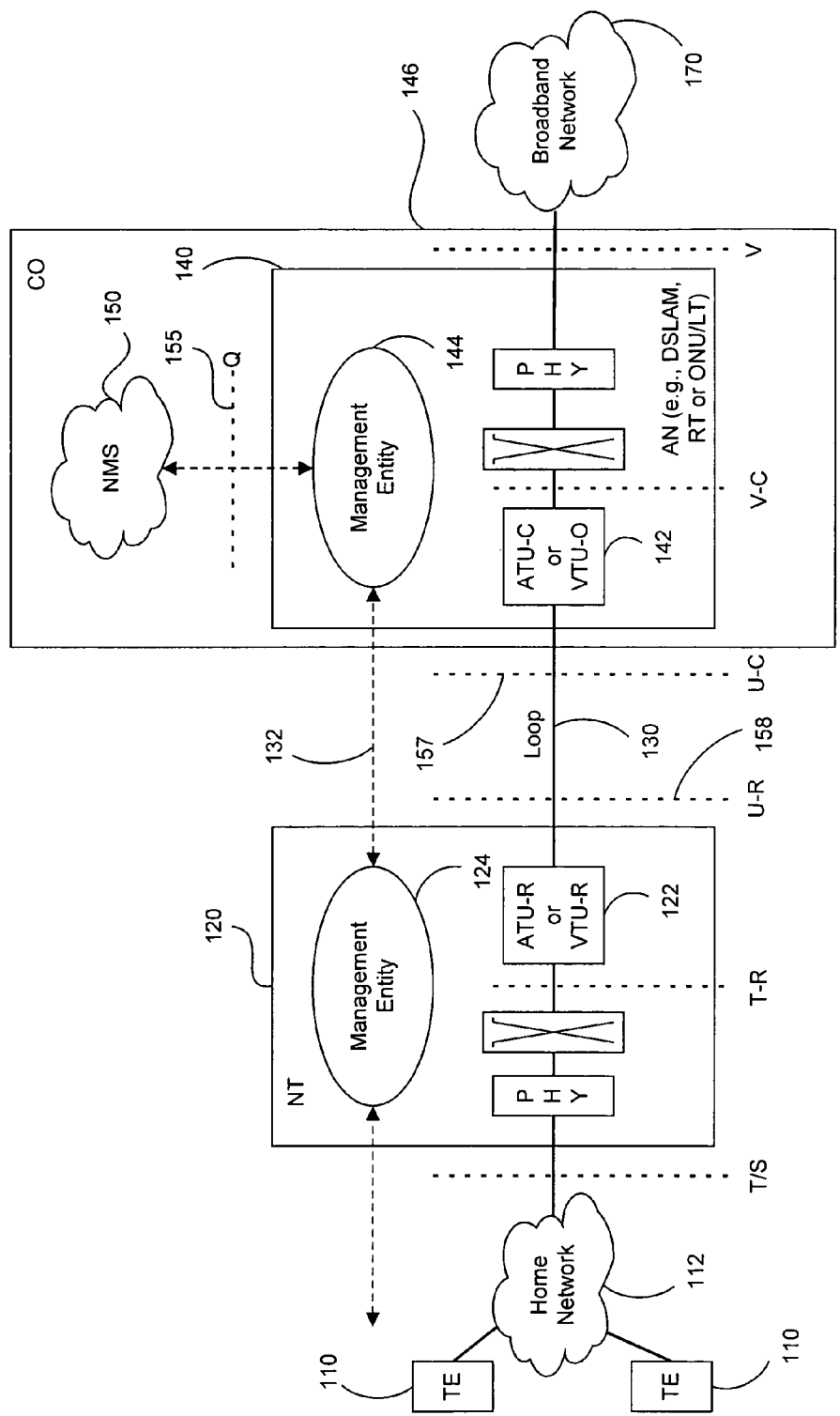
FIG. 1 is a schematic block reference model DSL system.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement methods and apparatus that permit the calculation, distribution and implementation of a QR factorization and, more specifically, the efficient implementation of the Q and/or Q* matrix multiplications as used in communication systems such as ADSL and VDSL. In particular, embodiments of the present invention are useful in the operation of a vectored DSL system. The communication system in which embodiments of the present invention may be used may include ADSL lines, VDSL lines and/or any other communication system components and/or lines with which the present invention is practical, as will be appreciated by those skilled in the art after reading the present disclosure.

As described in more detail below, implementation of a complex rotor computational unit and related methods according to one or more embodiments of the present invention can be part of a communication device (for example, a DSL modem). Such implementation may be controlled and/or or assisted by a complex rotor calculation unit in a local device (again, for example, a modem) or in a remote device, such as a controller (for example, in or as a DSL optimizer, dynamic spectrum manager or spectrum management center). The controller and/or complex rotor calculation unit can be located anywhere. In some embodiments, the controller and/or complex rotor calculation unit reside in a DSL CO, while in other cases they may be operated by a third party located outside the CO. The structure, programming and other specific features of a controller and/or complex rotor calculation unit usable in connection with embodiments of the present invention will be apparent to those skilled in the art after reviewing the present disclosure.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+(G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Technical Report TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL than it is in VDSL. However, the following discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or are available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
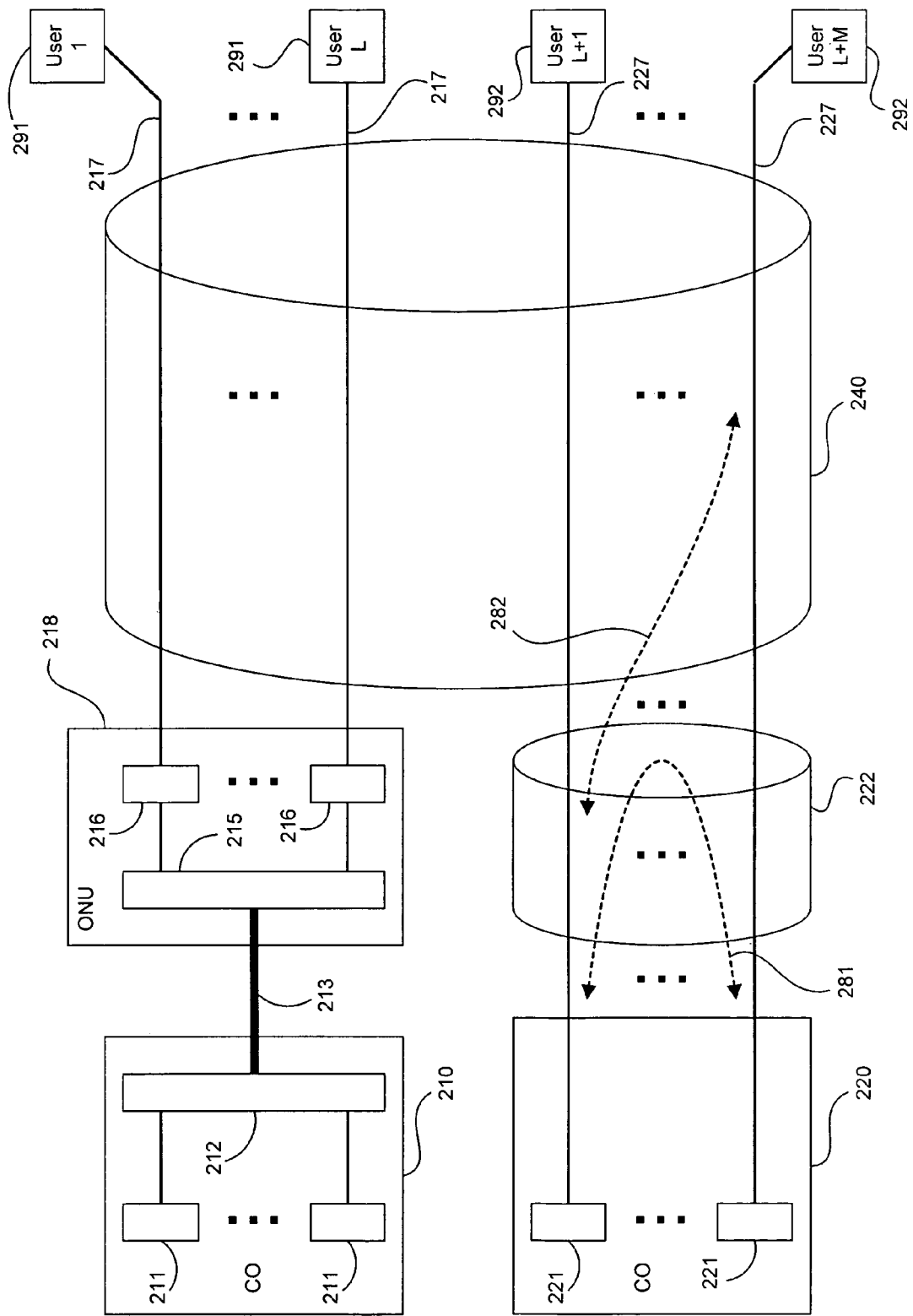
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from an DSL NMS can be found therein; others may be known to those skilled in the art.

A vectored DMT channel (both upstream and downstream) is characterized in synchronized digitally duplexed DSL systems by the simple matrix equation:

$$Y = HX + N \qquad \text{Equation (1)}$$

where H is a complex matrix that describes the insertion loss and crosstalk on a single tone and depends on the number of inputs and outputs used, including non-square versions of H when special channels such as phantom-mode signal channels are used. H is usually a square matrix that is size U×U for differential-only vectoring, and can be $(2U-1)\times(2U-1)$ in full two-sided vectoring with phantom-mode signals. H may be a different matrix for each tone and usually is not the same in upstream and downstream directions. A single H is used in this disclosure to simplify notation. The complex rotor computational unit applies a complex rotor to each such tone in either direction independently. For downstream, H may be altered by pre-multiplication of the inverse of the square root of the worst-case-noise spatial autocorrelation matrix on each tone. For upstream, noise-whitening can be handled in several ways, including through use of a correction to the decision feedback matrix R, or through pre-multiplication of the inverse of the square root of the noise autocorrelation matrix on each tone. In either case, a matrix "H" can be identified for QR factorization or the Q matrix may arise through other mechanisms that follow singular-value decomposition (for example, in two-sided vectoring) or approximations to MMSE GDFE implementation. Embodiments of the present invention use QR factorization of the matrix H as a typical form of implementation, but the invention is not limited solely to the Q matrix being generated by QR factorization of H.

For downstream transmission, the factorization $H = RQ^*$ is used, where the triangular R matrix defines a precoder (that sometimes trivially degenerates to an identity in differentially coupled channels with "spatially white" noise), and Q is a unitary matrix such that $QQ^* = Q^*Q = I$. If H is singular, the procedure can be generalized by eliminating unused (energy is zero) input dimensions (users on those dimensions are not active in the vectoring for any tone on which they are zeroed, so the corresponding column and row of H can be eliminated for such a user on the particular tone that carries zero energy) and reducing the size of H on that tone. The input of a vectored DMT system can be characterized by the matrix multiplication downstream (just before the inverse fast Fourier transform, IFFT, modulator) by Q. Q in turn is represented by a series of complex rotations according to embodiments of the present invention. If precoding is used prior to transmission of data, then the Q matrix can be implemented after precoding and prior to delivery of the data to the IFFT.

For upstream transmission, the factorization $H = QR$ is most often used (although other ways of generating the Q matrix also are possible), where the triangular R matrix defines a feedback section (that sometimes trivially degenerates to an identity in differentially coupled channels with "spatially white" noise), and Q is an unitary matrix such that $QQ^* = Q^*Q = I$. If H is singular, the procedure can be generalized by eliminating unused (energy is zero) input dimensions (eliminate row and column of H for those users on this tone that have zero energy) and making R triangular in appropriate positions and zero elsewhere. The input of a vectored DMT system can be characterized by the matrix multiplication upstream (just after the fast Fourier transform, FFT, demodulator) by $Q^*$. $Q^*$ in turn is represented by a series of complex rotations according to embodiments of the present invention. Where a GDFE or similar functionality is used in a receiver, then the $Q^*$ matrix can be implemented immediately prior to the GDFE.

The series of rotations for either matrix is a set that essentially takes the matrix H and, proceeding entry by entry, zeroes some of the entries in each row (upstream) or in each column (downstream). The same series of rotations generated in this procedure occurs in the receiver (upstream) or transmitter (downstream). This series may, of course, be different for each tone and for downstream and upstream.

A complex rotation is summarized by operation upon two complex entries in a vector, here shown as 2×2 without all the additional pass-through zeros and ones in the larger size matrix.

The unitary matrix used to implement the rotation satisfies $$\underbrace{\begin{bmatrix} a & b \\ c & d \end{bmatrix}}_{Q} \cdot \underbrace{\begin{bmatrix} a^* & c^* \\ b^* & d^* \end{bmatrix}}_{Q^*} = \begin{bmatrix} 1 & 0 \\ 0 & 1 \end{bmatrix} \quad \text{Eq. (2)}$$

which can be written in a general form with 4 degrees of freedom as:

$$\underbrace{\begin{bmatrix} |a|e^{j\theta_1} & -\sqrt{1-|a|^2}\, e^{j\theta_2} \\ \sqrt{1-|a|^2}\, e^{j(\phi-\theta_2)} & |a|e^{j(\phi-\theta_1)} \end{bmatrix}}_{Q} \cdot \quad \text{Eq. (3)}$$

$$\underbrace{\begin{bmatrix} |a|e^{j\theta_1} & \sqrt{1-|a|^2}\, e^{-j(\phi-\theta_2)} \\ -\sqrt{1-|a|^2}\, e^{-j\theta_2} & |a|e^{-j(\phi-\theta_1)} \end{bmatrix}}_{Q^*} = \begin{bmatrix} 1 & 0 \\ 0 & 1 \end{bmatrix}$$

where $|\alpha| \leq 1$.

A single complex post-multiply (downstream) rotation to zero an entry in the upper right position is:

$$\begin{bmatrix} \alpha & \beta \\ \gamma & \delta \end{bmatrix} \cdot \quad \text{Eq. (4)}$$
$$\begin{bmatrix} |a|e^{j\theta_1} & -\sqrt{1-|a|^2}\, e^{j\theta_2} \\ \sqrt{1-|a|^2}\, e^{j(\phi-\theta_2)} & |a|e^{j(\phi-\theta_1)} \end{bmatrix} = \begin{bmatrix} \alpha|a|e^{j\theta_1} + \beta\sqrt{1-|a|^2}\, e^{j(\phi-\theta_2)} & -\alpha\sqrt{1-|a|^2}\, e^{j\theta_2} + \beta|a|e^{j(\phi-\theta_1)} \\ \ldots & \ldots \end{bmatrix}$$
$$= \begin{bmatrix} k & 0 \\ \ldots & \ldots \end{bmatrix}$$

For the first term to be real:

$$\theta_1 = -arg(\alpha) = \varphi \quad \text{Eq. (5)}$$

$$\Phi - \theta_2 = -arg(\beta) = \psi \quad \text{Eq. (6)}$$

And for the second term to be zero:

$$|\alpha|\sqrt{1-|a|^2}\, e^{j(\theta_2 - \theta_1)} = |\beta|e^{j(\theta_2 - \phi)}|a|e^{j(\phi-\theta_1)} \Rightarrow \quad \text{Eq. (7)}$$
$$|\alpha|\sqrt{1-|a|^2} = |\beta||a| \Rightarrow |a|$$
$$= \frac{|\alpha|}{\sqrt{|\alpha|^2 + |\beta|^2}}$$

Therefore: $\quad$ Eq. (8)

$$Q = \frac{\begin{bmatrix} |\alpha|e^{j\varphi} & -|\beta|e^{j(\phi-\psi)} \\ |\beta|e^{j\psi} & |\alpha|e^{j(\phi-\varphi)} \end{bmatrix}}{\sqrt{|\alpha|^2 + |\beta|^2}}$$

But, as there is one more degree of freedom, by making $\theta_1 = \theta_2$, embodiments of the present invention use:

$$Q = \frac{\begin{bmatrix} |\alpha|e^{j\varphi} & -|\beta|e^{j\varphi} \\ |\beta|e^{j\psi} & |\alpha|e^{j\psi} \end{bmatrix}}{\sqrt{|\alpha|^2 + |\beta|^2}} \quad \text{Eq. (9)}$$

$$= \begin{pmatrix} e^{j\varphi} & 0 \\ 0 & e^{j\psi} \end{pmatrix} \cdot \frac{\begin{bmatrix} |\alpha| & -|\beta| \\ |\beta| & |\alpha| \end{bmatrix}}{\sqrt{|\alpha|^2 + |\beta|^2}}$$

$$= \begin{pmatrix} e^{j\varphi} & 0 \\ 0 & e^{j\psi} \end{pmatrix} \cdot \overline{Q}$$

where $\overline{Q}$ is a real rotation and $e^{j\varphi}$ and $e^{j\psi}$ can also be considered as a repeated real rotation (of two 2-dimensional real vectors that separately have the real and imaginary part of some complex number as inputs). Essentially, the complex rotation is then characterized by three real angles (one for $\overline{Q}$ denoted $$\phi = -\text{Tan}^{-1}\left(\frac{|\beta|}{|\alpha|}\right)$$

and one for each $\phi = -arg(\alpha)$ and $\psi = -arg(\beta)$).

Thus the mathematical rotation can be rewritten $$Q \cdot \begin{bmatrix} e_1 \\ e_2 \end{bmatrix} = \begin{bmatrix} f_1 \\ f_2 \end{bmatrix} \quad \text{Eq. (10)}$$

$$= \underbrace{\begin{pmatrix} e^{j\varphi} & 0 \\ 0 & e^{j\psi} \end{pmatrix}}_{\text{2 real rotations of complex elements}}$$

$$\underbrace{\left[\underbrace{\overline{Q} \cdot \mathcal{R}\begin{bmatrix} e_1 \\ e_2 \end{bmatrix}}_{\text{real rotation1}} + j \cdot \underbrace{\overline{Q} \cdot \mathcal{I}\begin{bmatrix} e_1 \\ e_2 \end{bmatrix}}_{\text{real rotation2}}\right]}_{\text{angle } \phi \text{ twice via } \overline{Q}}$$

-continued $$Q \cdot \begin{bmatrix} e_1 \\ e_2 \end{bmatrix} = \begin{bmatrix} f_1 \\ f_2 \end{bmatrix} \quad \text{Eq. (11)}$$

$$= \underbrace{\begin{pmatrix} e^{j\varphi} & 0 \\ 0 & e^{j\psi} \end{pmatrix}}_{\text{2 real rotations of complex elements}} \underbrace{\left[ \mathcal{R} \begin{bmatrix} e_3 \\ e_4 \end{bmatrix} + j \cdot \mathcal{J} \begin{bmatrix} e_3 \\ e_4 \end{bmatrix} \right]}_{\text{product of first two rotations}}$$

$$Q \cdot \begin{bmatrix} e_1 \\ e_2 \end{bmatrix} = \begin{bmatrix} f_1 \\ f_2 \end{bmatrix} \quad \text{Eq. (12)}$$

$$= \underbrace{\begin{pmatrix} e^{j\varphi} & 0 \\ 0 & e^{j\psi} \end{pmatrix}}_{\text{2 real rotations of complex elements}} \underbrace{\left[ \mathcal{R} \begin{bmatrix} e_3 \\ e_4 \end{bmatrix} + j \cdot \mathcal{J} \begin{bmatrix} e_3 \\ e_4 \end{bmatrix} \right]}_{\text{output of first two rotations}}$$

$$= \begin{bmatrix} e^{j\varphi} \cdot e_3 \\ e^{j\psi} \cdot e_4 \end{bmatrix}$$

$$= \begin{bmatrix} f_1 \\ f_2 \end{bmatrix}$$

Figure 3:
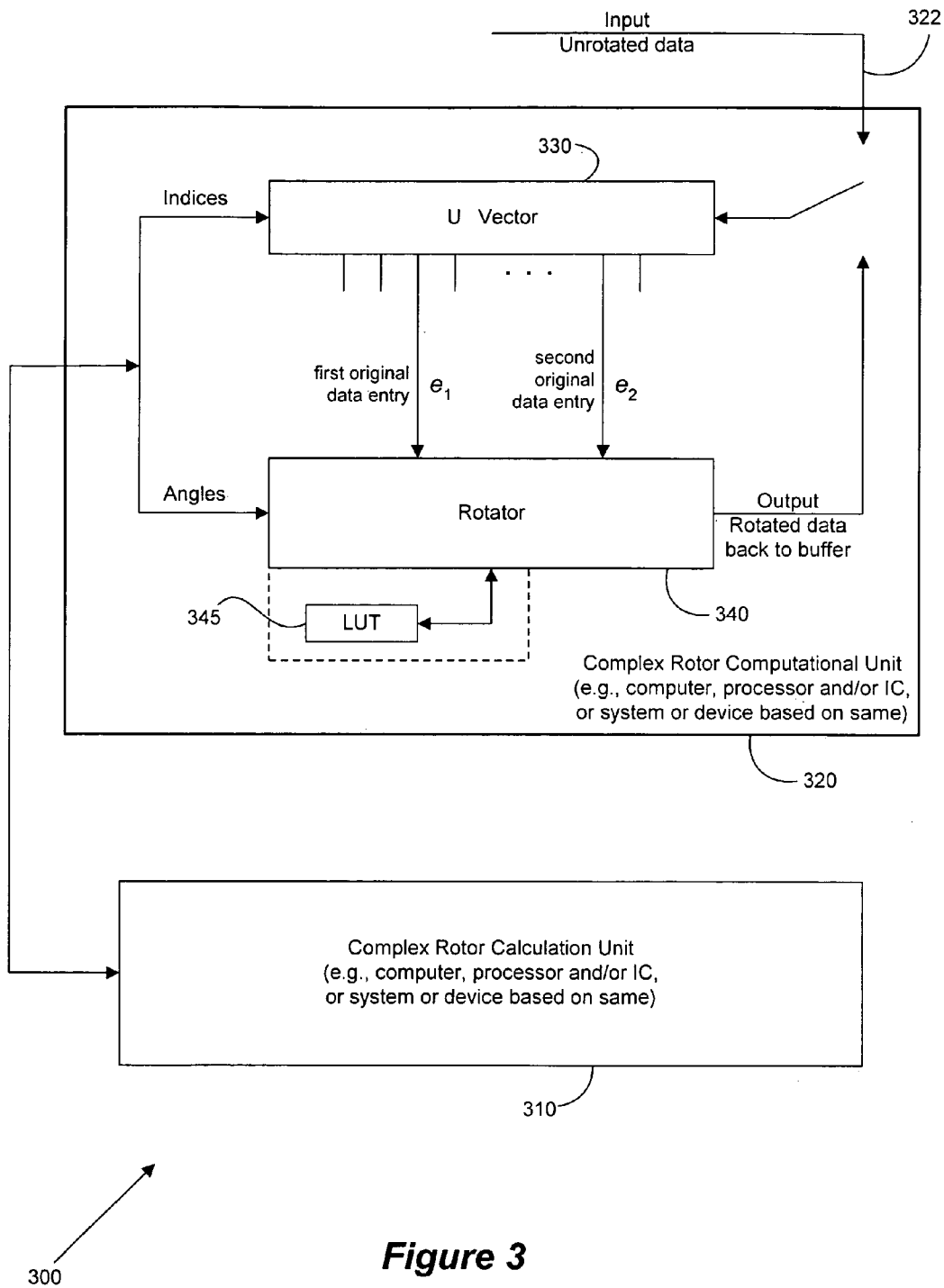
FIG. 3 is a schematic diagram of a complex rotor computational unit coupled to a complex rotor calculation unit used in connection with some embodiments of the present invention.

A complex rotor computational unit according to one or more embodiments of the present invention, such as the unit 320 shown in FIG. 3, would accept two original data entries $e_1$ and $e_2$ from the data vector in buffer 330 of unit 320, creating a two dimensional complex vector $$\begin{bmatrix} e_1 \\ e_2 \end{bmatrix}.$$

At its input, the complex-rotor computational unit also accepts the first real angle (specified as Φ by the complex-rotor calculation unit 310, which may be part of a DSL optimizer), extracts the cosine and sine from a look-up table, then separately applies a first real rotation (implemented as the $\overline{Q}$ matrix) to the real part of the two-dimensional vector $$\begin{bmatrix} e_1 \\ e_2 \end{bmatrix}$$

and then again as a second real rotation (again implemented as the $\overline{Q}$ matrix) to the imaginary part of that same vector $$\begin{bmatrix} e_1 \\ e_2 \end{bmatrix}.$$

The resultant two real vector outputs are treated as the real and imaginary parts (in both upper and lower element) of an intermediate complex vector $$\begin{bmatrix} e_3 \\ e_4 \end{bmatrix},$$

as seen in Equation (11). As will be appreciated by those skilled in the art, the first and second rotations using the $\overline{Q}$ matrix can be implemented in any order or simultaneously; sequence is not important.

The third and fourth real rotations (specified by φ and ψ by the complex rotor calculation unit, which may be part of a DSL optimizer) then are applied to each of the individual complex numbers $e_3$ and $e_4$ in the upper (rotation by angle φ) and lower entries (rotation by angle ψ), respectively, of the resultant complex output $$\begin{bmatrix} e_3 \\ e_4 \end{bmatrix}$$

of the first and second rotations (again, for example, using the same sine and cosine look-up tables). As will be appreciated by those skilled in the art, like the first and second rotations using the $\overline{Q}$ matrix, the third and fourth rotations can be implemented in any order or simultaneously; sequence is not important. These third and fourth rotations yield $$\begin{bmatrix} e^{j\varphi} \cdot e_3 \\ e^{j\psi} \cdot e_4 \end{bmatrix} = \begin{bmatrix} f_1 \\ f_2 \end{bmatrix},$$

as seen in Equation (12), where $f_1$ is the fully rotated "version" of the first original data entry from the data vector of buffer 330, and where rotated data entry $f_1$ replaces $e_1$ in that data vector of buffer 330. Similarly, rotated data entry $f_2$ replaces original data entry $e_2$.

Further simplification of the complex rotation is possible by eliminating the requirements of Equations (5) and (6). If the first term of the resulting vector after the rotation is not required to be real, then the complex rotation can be performed with only three real rotations, and can characterized by only two angles. Embodiments of the present invention may use:

$$Q = \begin{pmatrix} 1 & 0 \\ 0 & e^{j(\psi-\varphi)} \end{pmatrix} \cdot \frac{\begin{bmatrix} |\alpha| & -|\beta| \\ |\beta| & |\alpha| \end{bmatrix}}{\sqrt{|\alpha|^2 + |\beta|^2}} = \begin{pmatrix} 1 & 0 \\ 0 & e^{j(\psi-\varphi)} \end{pmatrix} \cdot \overline{Q} \quad \text{Eq. (13)}$$

where $\overline{Q}$ is a real rotation and $e^{j(\psi-\varphi)}$ can also be considered as a repeated real rotation. Essentially, the complex rotation is then characterized by two real angles (one for $\overline{Q}$ denoted $$\phi = -\text{Tan}^{-1}\left(\frac{|\beta|}{|\alpha|}\right)$$

and one equal to $\psi-\varphi = \arg(\alpha) - \arg(\beta)$).

Thus, the complex rotor computational unit uses a minimum of 2 angles and 2 indices for the vector elements of Y in upstream processing. In downstream processing, the minimum of 2 angles and 2 indices are used on vector elements of an intermediate transmitter vector that leads to X.

Just as the above rotation as a post-multiplied Q applies to the downstream direction, an analogous procedure and rotation characterize the upstream direction, which instead operates by rows because it corresponds to a post-multiplication of H. If the R matrix is considered upstream lower triangular and downstream upper triangular, then the matrix Q is defined exactly the same way even if applied on the left for upstream while on the right for downstream.

The order of rotations to implement the Q matrix follows the order necessary to zero the entries in H to make it triangular. Any entry for which the angles are near zero can be omitted. The order may be specified by two indices corresponding to the columns of a downstream H (or the rows of an upstream H) upon which the "triangularizing" complex Givens rotation originally occurred. One order that can be used with embodiments of the present invention is to always (on all tones) place the user with largest data rate first for downstream and last for upstream, then correspondingly follow in order of data rates.

The following discussion applies individually to each tone of a vectored DMT system. The complex rotor computational unit then can accept its first inputs (downstream) from the vector DMT encoder outputs corresponding to the two indices supplied. The unit then applies a sequence of real rotations characterized by real angles as described above, and places the outputs in the same indexed positions (essentially updating the two encoder outputs). The complex rotor computational unit is then ready to accept the next set of angles and indices. The sequence of angles and pairs of corresponding user/line indices continues until the set of rotations characterizing the unitary matrix is complete. Each tone may have different index sets and angles, so the complex-rotor computational unit can be reused for each tone (or there may be several complex-rotor computational units that are shared to implement the "Q" matrices for all tones). Otherwise, if the complex-rotor computational unit is sufficiently high speed, it can be used successively for all tones. A high-speed implementation could then make best use of whatever rotational capability was available. Because the IFFT (downstream) and FFT (upstream) also are each a series of complex rotations, the same computational unit used by the IFFT could also be used by the complex-rotor computational unit to achieve a more compact design with either one or a small number of high-speed complex rotational units.

Additionally, the complex-rotor computational unit may employ techniques for multiplying a matrix and a vector, which may exploit the properties of the Q matrix. When the Q matrix is observed to have some its elements equal to 0 or sufficiently close to 0, then it may be represented as a "sparse" matrix. Computational savings may then be realized by employing sparse matrix-dense vector multiplication techniques, which are well known to those skilled in the art.

Assuming that the Q matrix has already been found (for example, by means of Givens rotations, or Householder transformations, or Gram-Schmidt decomposition, all applied for the complex case), the Q matrix may have several of its elements equal to 0 or (sufficiently) close to 0. Thus, Q can be represented as a sparse matrix, while the received vector x remains "dense", meaning that all its elements are non-zero.

The number of operations for performing the matrix-vector multiplication of Q by x is in the order of $L^2$, where L is the number of elements of the vector x. This number can be reduced considerably if only a few elements of Q are actually non-zero.

EXAMPLE

Let Q be represented by a data structure which includes L sets. Each set corresponds to a row of the sparse matrix Q. Each set contains a number of pairs (col, val), where col defines the column of a non-zero element at a given row, and val corresponds to the value of this non-zero element.

Letting y=Q*x be the vector output, then the computation of the value for a specific row of y can be written as:

y[row]=0 for each pair (col, val) in set corresponding to row, y[row]=y[row]+val*x[col]

end

Thus the number of operations can be significantly reduced for sparse matrices. Such methods can be applied in a straightforward way for any MIMO processing in a vectored transmitter or vectored receiver.

Each tone can use a tonal complex rotor computational unit such as the one shown in FIG. 3 (which again could be a single unit shared by all). The input vector may be stored initially in a vector register. A high-speed two-dimensional rotation is executed several times in succession, each time acting upon elements i and j that are altered for each successive rotation. The rotation angles (or their equivalent) may also be specified by the complex rotor calculation unit. There can be up to l(l−1)/2 such successive complex rotations (or thus l(l−1) sets of angles with associated pairs of indices), where lxl is the size of the square Q matrix, and may vary depending on whether other signaling techniques are used (for example, phantom-mode signals or bonded communications). Again, the complex rotation is a series of a minimum of 3 real rotations that are specified by a minimum of 2 real angles. The complex rotor computational unit thus can be a high-speed unit, perhaps implemented in the same device for each and every tone. Thus, up to $$\frac{N \cdot l(l - 1)}{2}$$

complex rotation operations per 4000 Hz symbol could be executed. The chip designer of a device such as a modem that might implement the complex rotor computational unit can, in some cases, communicate a limit on the number of rotations imposed by the modem's computational capacity to avoid exceeding that capacity (and possibly resulting in less performance gain).

A system 300 illustrating one or more embodiments of the present invention is shown in FIG. 3. The system 300 includes a complex rotor calculation unit 310 that provides angles and indices to a complex rotor computational unit 320. The complex rotor calculation unit 310 may calculate the various values provided to complex rotor computational unit 320 either within the same device (for example, a modem) as complex rotor computational unit 320 (for example, within the same modem or CPE) or at a remote location, such as a separate controller, DSL optimizer, or the like.

Complex rotor computational unit 320 includes an input 322 for data prior to rotation data. The data provided by input 322 is a vector that can be stored and updated in a vector module 330, which can be a buffer, database, or any other suitable apparatus for the required function. Upon receiving an l-dimensional (possibly precoded) signal vector for each tone and a set of indices from complex rotor calculation unit 310, module 330 supplies the data corresponding to the indices to a rotator computation module 340.

Rotator computation module 340 (for example, a computer, processor, IC or other apparatus based on such devices) applies appropriate rotations to the indexed data supplied by vector module 330 using the angles provided by complex rotor calculation unit 310. Module 340 may calculate and/or obtain sine and cosine values in any appropriate way and/or from any suitable source, such as a lookup table 345 that may be part of rotator computation module 340 or may be separate from module 340. Any equivalent set of quantities may be used for this computation—for instance, the quantities sin $\Phi$ (cos $\Phi = \sqrt{1-\sin^2\Phi}$ always since $0 \leq \Phi \leq 90°$), cos $\phi$, sin $\phi$, cos $\psi$ and sin $\psi$. Where two indices are used, the rotator computation module 340 performs a 2-D rotation of the U vector data. The rotated data (for example, rotated symbol vector data for each tone) is then sent back to the vector module 330 and is stored again (for example, according to the data's indices).

When complex rotor computational unit 320 has completed the data rotation, vector module 330 will contain an l-dimensional, complex, rotated symbol vector. The complex rotor calculation unit 310 and complex rotor computational unit 320 and their various components may be implemented on computers or processors or other apparatus based on such devices, as will be appreciated by those skilled in the art. Moreover, the rotator computation module 340 may be the same unit in system 300 that performs IFFTs for downstream transmissions and/or FFTs for upstream transmissions. Module 340 may be configured to perform other operations, too. For example, module 340 may be configured to zero entries that correspond to data for which all angles are near zero, thereafter deleting the zeroed entries to save computational resources. Similarly, the module 340 could tailor its functioning (for example, its sequence of rotations) to the computational capacity of the module 340, the complex rotor computational unit 320 and/or any apparatus on which these are implemented by deleting a given number of small rotations. As will be appreciated by those skilled in the art, the H matrix from which the angles of rotation and indices are obtained need not be square (for example, in the case where phantom-mode signals are implemented). QR factorization of non-square matrices requires some adjustment in that the triangular R matrix has some additional zeroed elements, but is otherwise straightforward to one skilled in the art: For a K×N matrix, there are two situations for QR factorization where K>N or K<N. In the former case the early rotations rotate the bottom K−N rows of H into the upper N rows with a series of (K−N)N complex rotations before proceeding with the usual N×N QR factorization on the upper remaining N rows. In the latter case of K<N, the QR factorization focuses only on the first K columns of H, and the process necessarily will result in all zeros in the N−K remaining columns as long as the ordering of H users is selected so the first K columns are linearly independent.

Figure 4A:
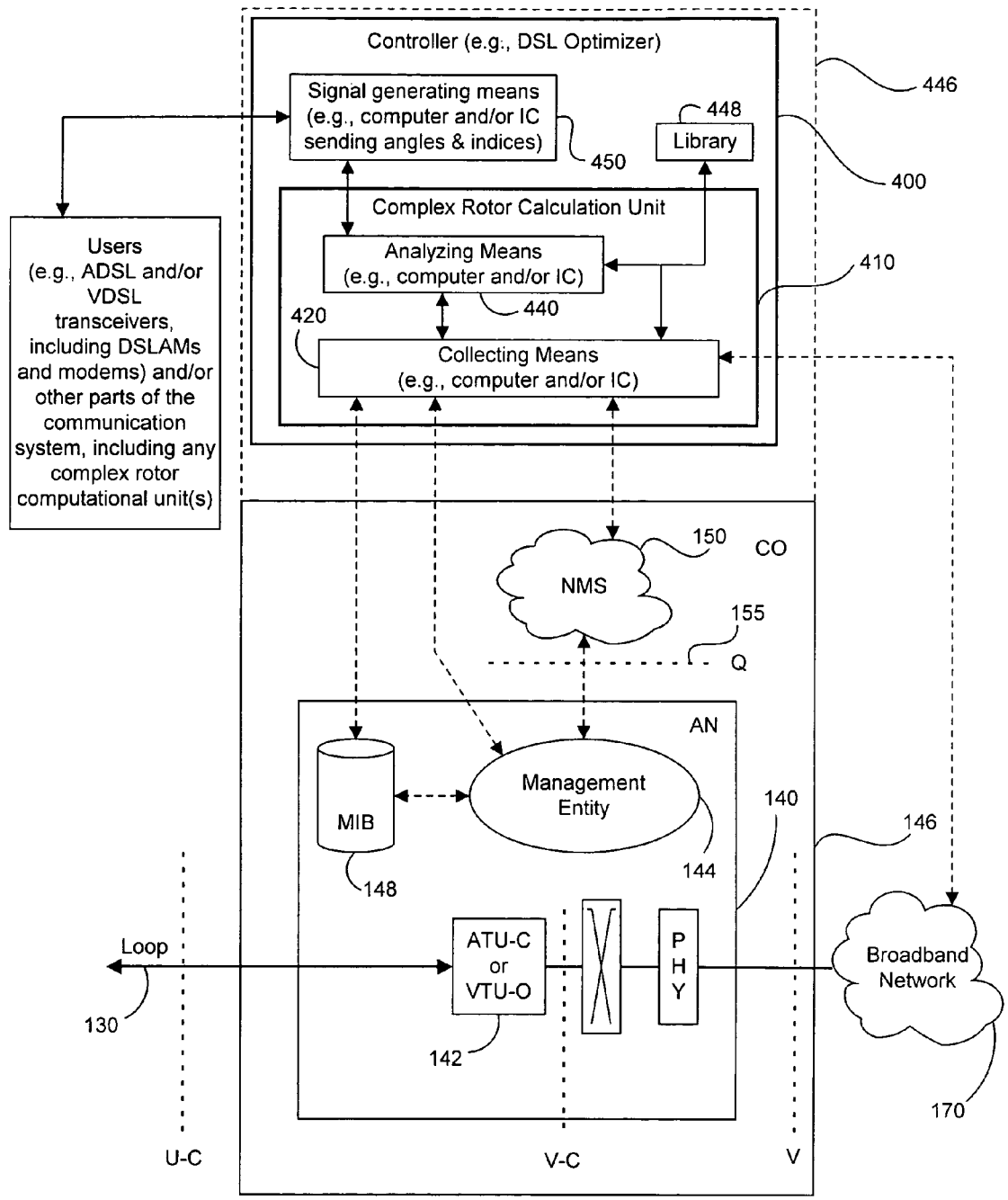
FIG. 4A is a controller and communication system implementing one or more embodiments of the present invention.

According to one embodiment of the present invention shown in FIG. 4A, a complex rotor calculation unit 410 may be part of an independent entity coupled to a DSL system, such as a controller 400 (for example, a DSL optimizer) assisting users and/or one or more system operators or providers their use of the system. (A controller or DSL optimizer may also be referred to as a DSM server, dynamic spectrum manager, Dynamic Spectrum Management Center, DSM Center, Spectrum Maintenance Center or SMC.) In some embodiments, the controller 400 may be an independent entity, while in other embodiments the controller 400 can be an ILEC or CLEC operating a number of DSL lines from a CO or other location. As seen from the dashed line 446 in FIG. 4A, the controller 400 may be in the CO 146 or may be external and independent of CO 146 and any company operating within the system. Moreover, controller 400 may be coupled to and/or controlling DSL and/or other communication lines in multiple COs.

Figure 6:
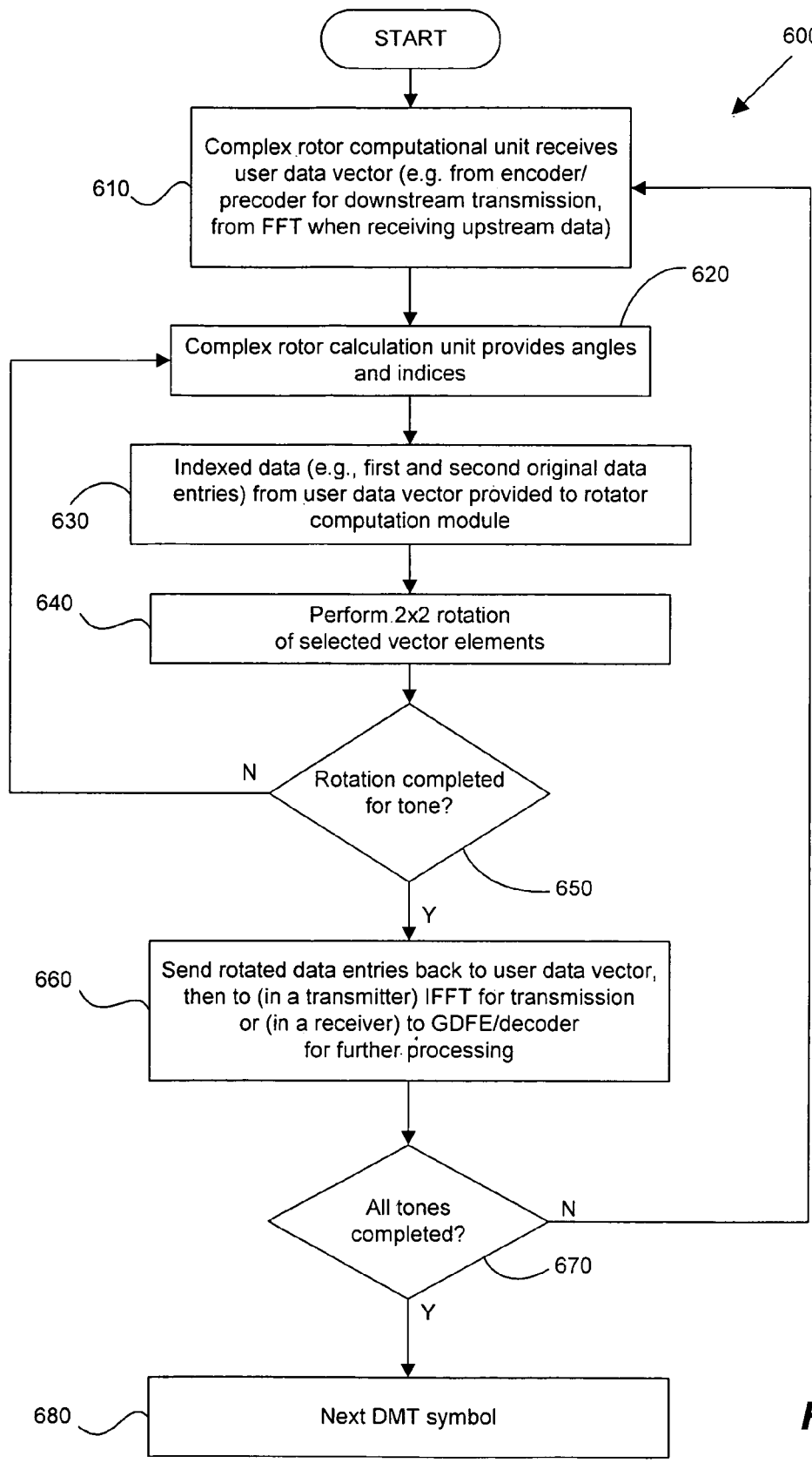
FIG. 6 is a flow diagram of a method according to one embodiment of the present invention.

The complex rotor calculation unit 410 includes collecting means 420 (which can be a computer, processor, computer module, etc. of the type generally shown in FIG. 6, or a device based on such another device) and analyzing means 440 (which also can be a computer, processor, computer module, etc. of the type generally shown in FIG. 6, or a device based on such another device). As seen in FIG. 4A, the collecting means 420 may be coupled to NMS 150, ME 144 at AN 140 and/or the MIB 148 maintained by ME 144. Data also may be collected through the broadband network 170 (for example, via the TCP/IP protocol or other protocol or means outside the normal internal data communication within a given DSL system). One or more of these connections allows the complex rotor calculation unit to collect operational data from a communication system such as a DSL system. Data may be collected once or over time. In some cases, the collecting means 420 will collect on a periodic basis, though it also can collect data on-demand or any other non-periodic basis (for example, whenever a DSLAM or other component sends data to the compliance control unit), thus allowing the complex rotor calculation unit 410 to update its information, matrix and channel information, etc., if desired. Data collected by means 420 is provided to the analyzing means 440 for analysis and any calculation of needed matrices, angles, indices, etc.

In the exemplary system of FIG. 4A, the analyzing means 440 is coupled to a signal generating means 450 (which also can be computer, processor, computer module, etc. of the type generally shown in FIG. 6, or a device based on such another device) in the controller 400. This signal generator 450 is configured to generate and send instruction signals to modems and/or other components of the communication system (for example, DSL transceivers and/or other equipment, components, etc. in the system), including any complex rotor computational unit(s) implementing embodiments of the present invention. These instructions may include operational information used to implement complex rotations and the angles and indices of some embodiments of the present invention used to implement those rotations, etc. The instructions may be generated periodically to update previously-supplied information or may be sent in response to requests from modems and the like implementing complex rotations and requiring information to do so.

Embodiments of the present invention can utilize a database, library or other collection of data pertaining to the data collected and past implementations of the complex rotations, angles, indices, etc. This collection of reference data may be stored, for example, as a library 448 in the controller 400 of FIG. 4A and used by the analyzing means 440 and/or collecting means 420.

In some embodiments of the present invention, the complex rotor calculation unit 410 may be implemented in a computer such as a PC, workstation or the like. The collecting means 420 and analyzing means 440 may be software modules, hardware modules or a combination of both, as will be appreciated by those skilled in the art. When working with a large numbers of modems, databases may be introduced and used to manage the volume of data collected.

Figure 4B:
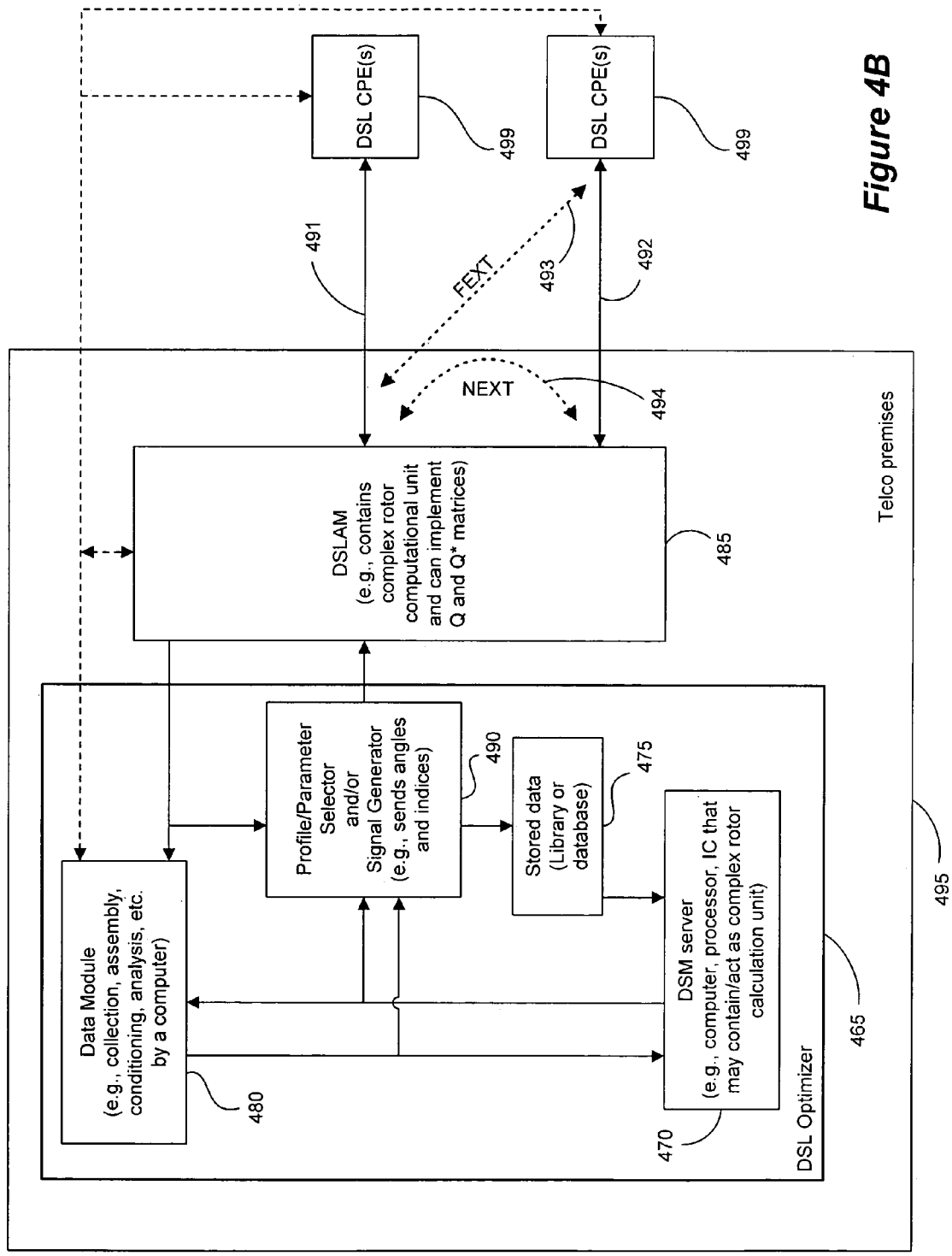
FIG. 4B is a DSL optimizer and communication system implementing one or more embodiments of the present invention.

Another embodiment of the present invention is shown in FIG. 4B. A DSL optimizer 465 operates on and/or in connection with a DSLAM 485 or other DSL system component, either or both of which may be on the telco premises 495. The DSL optimizer 465 includes a data module 480, which can collect, assemble, condition, manipulate and supply operational data for and to the DSL optimizer 465. Module 480 can be a computer such as a PC or the like or part of such a computer, such as a processor or IC, and either implemented in software, hardware or both. Data from module 480 is supplied to a DSM server 470 (for example, a computer or IC or data analysis module in such a device) for analysis (for example, calculation of the angles, indices and/or other information needed to implement the complex rotations, etc.). Module 470 may be part of and/or implemented in the same computer as used for module 480 or may be a separate unit. Information may also be available from a telco database 475.

A parameter selector 490 may be used as an instruction and/or signal generator to implement profiles (for example, sending angles and indices to a complex rotor computational unit in a DSLAM or other upstream device). Unit 490 also may generate other operating mode instructions for communication system components and users pursuant to embodiments of the present invention. Information used in and by a complex rotor computational unit may be selected and sent under the control of the analysis module 470 or in any other suitable manner, as will be appreciated by those skilled in the art. Complex rotations using information from unit 490 are implemented in the DSLAM 485 and/or any other appropriate DSL system component equipment. Such equipment is coupled to DSL equipment such as customer premises equipment 499. Data is transmitted on communication lines 491, 492 for users 499. The system of FIG. 4B can operate in ways analogous to the system of FIG. 4A, as will be appreciated by those skilled in the art, though differences are achievable while still using embodiments of the present invention.

Figure 5A:
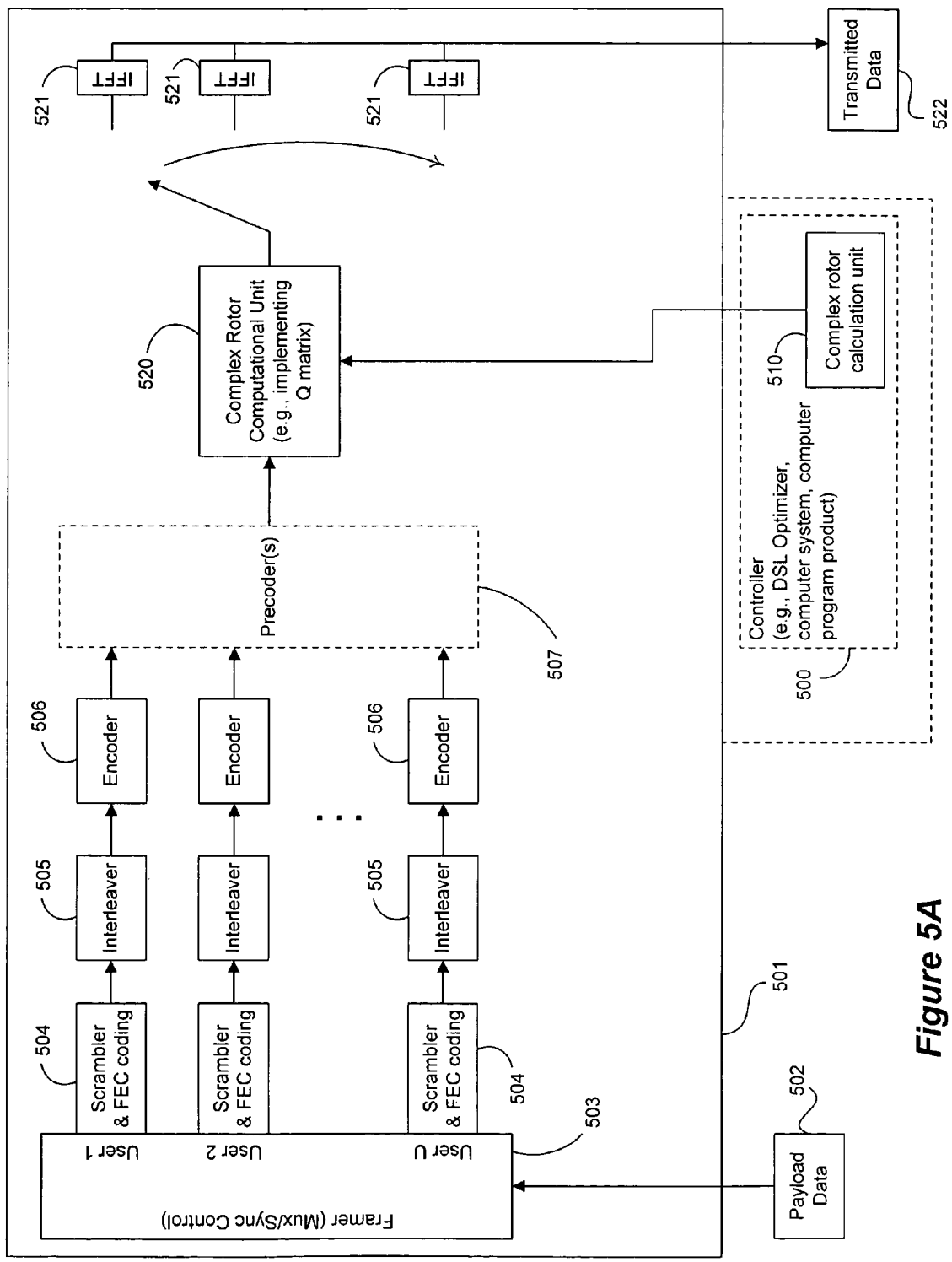
FIG. 5A is a DSL transmitter implementing one or more embodiments of the present invention.

FIG. 5A illustrates one embodiment of the present invention in the context of a vectored DSL transmitter 501 of the type found in a DSLAM or other upstream device. Payload data 502 of U lines is provided to a framer 503, which can include scrambling and FEC coding 504 for the U lines, as well as other processing, as will be appreciated by those skilled in the art. Data may be sent to an interleaver 505 in lines where impulse noise is an issue. The data for each user is encoded at an encoder 506, which outputs U data streams of complex numbers. A multi-user precoder 507 may be included in some transmitters for precoding data to be transmitted. After preceding, the data is sent to a complex rotor computational unit 520, such as the one illustrated in FIG. 3. Unit 520 may be coupled to a complex rotor calculation unit 510 that can either be part of device 501 or be separate from device 501 (for example, part of a controller 500). After implementation of the complex rotations, the rotated data is sent to an inverse fast Fourier transform (IFFT) unit 521 prior to transmission at 522. The IFFT units 521 accumulate each user's data so that an appropriate Fourier transform can be performed when sufficient data from a given user has been precoded and sent to unit 520.

Figure 5B:
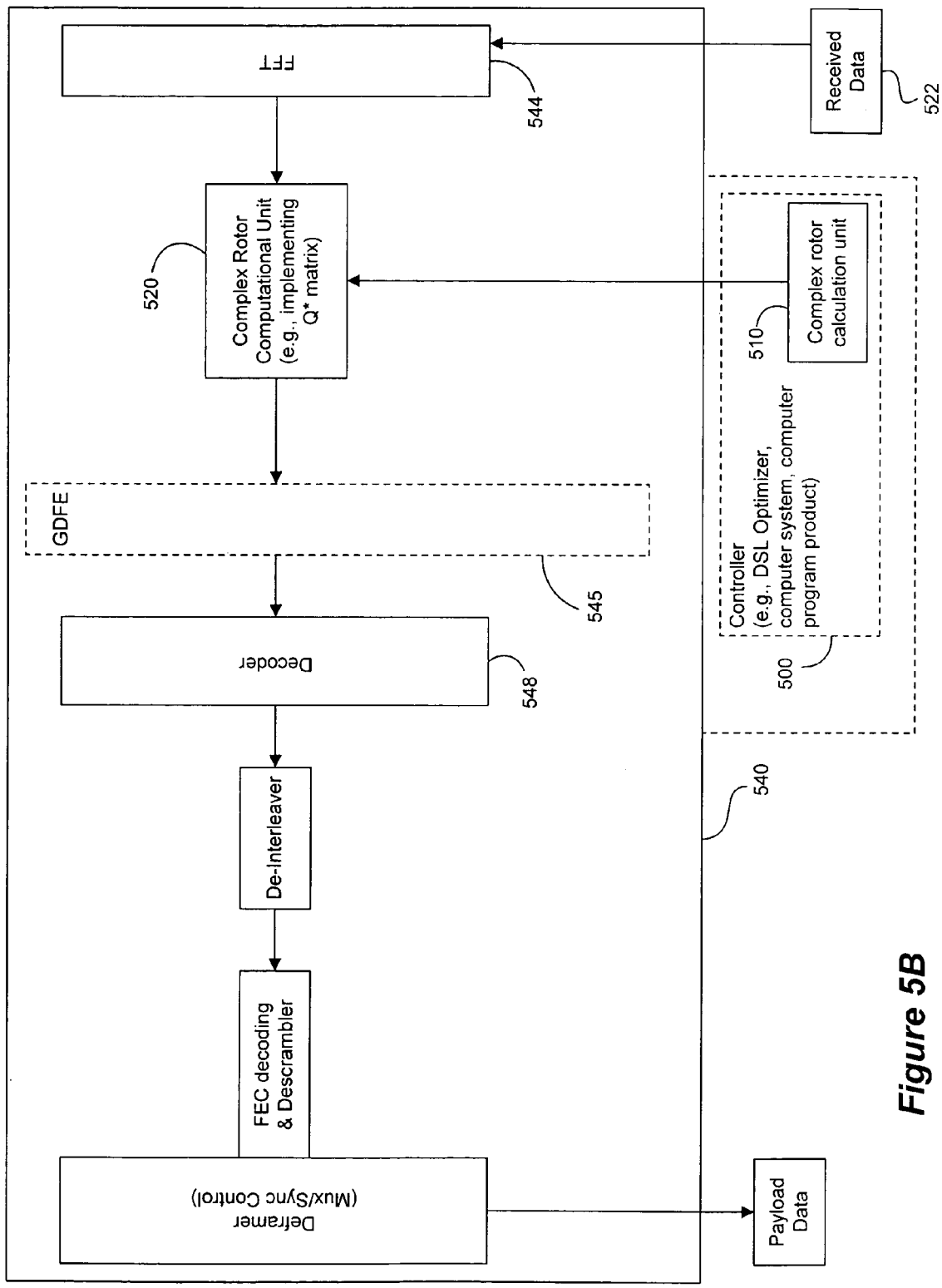
FIG. 5B is a DSL receiver implementing one or more embodiments of the present invention.

FIG. 5B illustrates that a receiver 540 also implements a complex rotor computational unit 510 between the FFT units 544 and the receiver's decoder 548. In some cases, a GDFE 545 might be used and would accept the output of the complex rotor computational unit 520. Again, the complex rotor computational unit 520 might be coupled to a controller 500 or other device internal to or external to receiver 540. This controller 500 supplies angles and indices to the complex rotor computational unit 520 as described above.

A method 600 according to one or more embodiments of the present invention is shown in FIG. 6. A complex rotor computational unit receives a user data vector at 610. A set of indices and angles are received at 620, identifying the 2 data entries to be rotated from the received vector. At 630 the indexed data is sent to a rotator computation module after which a 2×2 rotation of the selected vector elements is performed at 640. At decision 650 there is an evaluation made as to whether the rotation for the given tone is completed. If not, then the next angles and indices are provided at 620 for the next rotation. If the tone's data has been rotated, then the rotated data vector is sent to an IFFT in a transmitter or to a GDFE or decoder in a receiver at 660. When all tones are determined to be completed at 670, the next DMT symbol can be processed at 680. Otherwise, the next user data vector for the subject DMT symbol is received at 610 and the process continues.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer.

The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
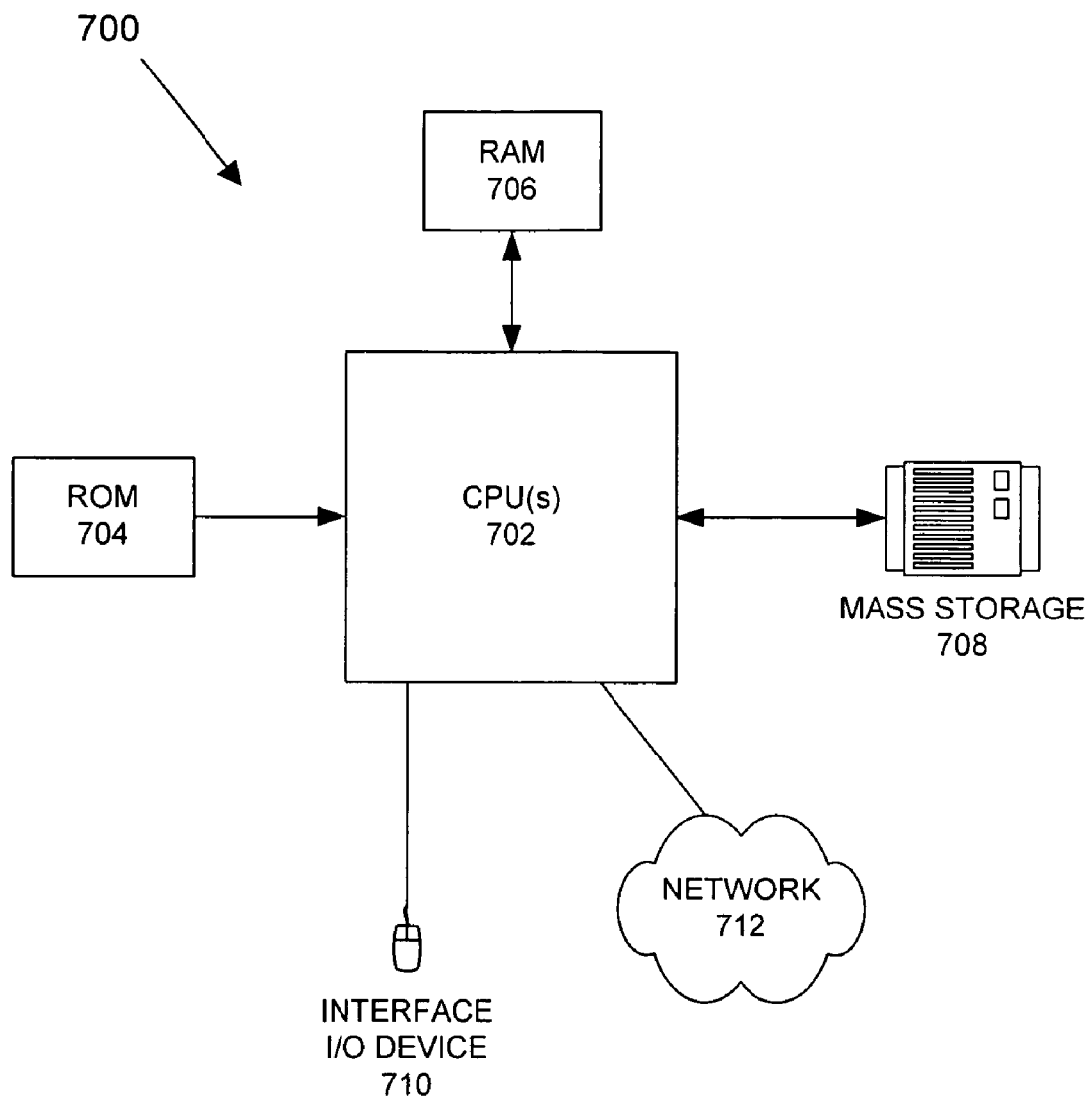
FIG. 7 is a block diagram of a typical computer system or integrated circuit system suitable for implementing embodiments of the present invention.

FIG. 7 illustrates a typical computer system that can be used by a user and/or controller in accordance with one or more embodiments of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 also is coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 also is coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 708 or 714 and executed on CPU 702 in conjunction with primary memory 706. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method in a hardware based system, having a processor and memory for processing indexed Digital Subscriber Line (DSL) data, the method comprising:
    (1) receiving a user data vector;
    (2) receiving a set of indices and angles that identify data entries to be rotated from the received user data vector;
    (3) performing, via the hardware based system, a 2×2 complex rotation of selected vector elements, wherein performing the 2×2 complex rotation comprises:
        obtaining a first angle, a second angle, a first index and a second index from the set of indices and angles received,
        obtaining a first original data entry from the indexed DSL data using the first index,
        obtaining a second original data entry from the indexed DSL data using the second index,
        performing a complex rotation of the first original data entry and the second original data entry as follows:
        applying a first real rotation using a first real rotation angle to a real part of the first and second original data entries resulting in a first complex output;
        applying a second real rotation using the first real rotation angle to an imaginary part of the first and second original data entries, resulting in a second complex output;
        applying a third real rotation using a second real rotation angle to the first complex output, resulting in the first rotated data entry complex output;
        applying a fourth real rotation using a third real rotation angle to the second complex output, resulting in the second rotated data entry complex output;
        replacing the first original data entry with the first rotated data entry in the indexed DSL data, and
        replacing the second original data entry with the second rotated data entry in the indexed DSL data;
    (4) repeating steps 2-3 until the 2×2 complex rotation is complete for one of a plurality of tones in the indexed DSL data; and
    (5) repeating steps 1-4 for each of the plurality of tones present in the indexed DSL data.

2. The method of claim 1 wherein performing the 2×2 complex rotation further comprises at least one operation selected from the group comprising:
    implementing a Q matrix prior to transmission of DSL data, wherein the Q matrix is a pre-transmission unitary matrix; and implementing a Q* matrix after receipt of DSL data, wherein the Q* matrix is a post-reception unitary matrix.

3. The method of claim 1 wherein performing a complex rotation of the first original data entry and the second original data entry using the first angle and the second angle to generate the first rotated data entry and the second rotated data entry comprises:
- generating a two dimensional original column vector comprising the first original data entry in the upper position and the second original data entry in the lower position, wherein the first original data entry and the second original data entry each comprise a complex number having a real part and an imaginary part;
- applying a first real rotation using the first angle to the real parts of the original column vector to generate a two dimensional intermediate column vector representing the real parts of a first intermediate data entry in the upper position and a second intermediate data entry in the lower position;
- applying a second real rotation using the first angle to the imaginary parts of the original column vector to generate a two dimensional intermediate column vector representing the imaginary parts of the first intermediate data entry in the upper position and the second intermediate data entry in the lower position;
- selecting the first intermediate data entry to generate the first rotated data entry; and
- applying a third real rotation using the second angle to the second intermediate data entry to generate the second rotated data entry.

4. The method of claim 1 wherein the indexed DSL data comprises data in a vector DSL Discrete MultiTone (DMT) encoder.

5. The method of claim 1 wherein the method further comprises:
- determining sine and cosine for the first angle by extracting the first angle sine and cosine from a lookup table; and
- determining sine and cosine for the second angle by extracting the second angle sine and cosine from a lookup table.

6. The method of claim 1 further comprising:
- performing steps 1-5 of claim 1 multiple times on a downstream transmit vector to zero entries in an H matrix to make the H matrix triangular, wherein the H matrix is a complex matrix that describes insertion loss and crosstalk on a single tone of the indexed DSL data.

7. The method of claim 6 wherein performing the complex rotation comprises either: 1) performing the rotations on the columns of H, or alternatively, performing the rotations on the rows of H.

8. The method of claim 1 wherein the first angle, the second angle, the first index and the second index are obtained by a complex rotor calculation unit.

9. A hardware based Digital Subscriber Line (DSL) system having a processor and memory to process indexed DSL data, comprising:
- a complex rotor computational unit; and
- a controller coupled with the complex rotor computational unit, wherein the controller comprises a complex rotor calculation unit coupled with the complex rotor computational unit, the complex rotor calculation unit to receive a matrix Multiple Input Multiple Output (MIMO) transfer function for a vectored channel communicably interfaced with the DSL system, and the complex rotor calculation unit to further calculate a complex form of a matrix for QR factorization of the channel, wherein the matrix is a pre-transmission unitary matrix, and wherein the complex form of the matrix comprises a Givens implementation characterized by a sequence of complex rotations to be implemented by the complex rotor computational unit, the sequence of complex rotations comprising at least a 2×2 complex rotation in which a first original data entry of the matrix is replaced with a first rotated data entry complex output and in which a second original data entry of the matrix is replaced with a second rotated data entry complex output, and wherein the 2×2 complex rotation comprises:
  - an application of a first real rotation using a first real rotation angle to the a part of the first and second original data entries to result in a first complex output,
  - an application of a second real rotation using the first real rotation angle to an imaginary part of the first and second original data entries, to result in a second complex output,
  - an application of a third real rotation using a second real rotation angle to the first complex output, to result in the first rotated data entry complex output, and
  - an application of a fourth real rotation using a third real rotation angle to the second complex output, to result in the second rotated data entry complex output.

10. The hardware based DSL system of claim 9 wherein the complex rotor calculation unit provides the complex rotor computational unit with a plurality of real angles and a pair of integer indices for each of a set of successive complex rotor calculations, and further wherein the complex rotor computational unit implements each complex rotation as a series of real rotations to generate complex outputs.

11. The hardware based DSL system of claim 9 wherein the complex rotor computational unit applies the complex rotations to at least one of the following: data sent upstream; or data sent downstream.

12. The hardware based DSL system of claim 9 wherein the complex rotor computational unit further performs one or both of the operations selected from the group comprising:
- an Inverse Fast Fourier Transform (IFFT) function in a downstream system; and
- a Fast Fourier Transform (FFT) function in an upstream system.

13. The hardware based DSL system of claim 9 wherein the complex rotor calculation unit deletes the smallest rotations that cannot be used by the complex rotor computational unit, wherein the smallest rotations that cannot be used by the complex rotor computational unit are derived based on rotations for which all angles are near zero.

14. The hardware based DSL system of claim 9 wherein the DSL controller is comprised within a DSL device communicably interfaced with the DSL system.

15. The hardware based DSL system of claim 9 wherein the controller is comprised within a DSL optimizer device that is distinct from the DSL system and communicably interfaced with the DSL system.

16. The hardware based DSL system of claim 9 wherein the controller is comprised within a DSL device communicably interfaced with the DSL system, and wherein the DSL device comprises one device selected from the group comprising:
- a DSL Access Multiplier (DSLAM);
- a Optical Network Unit/Line Termination (ONU/LT) device;
- a Remote Terminal (RT) device; and
- a modem.

17. A non-transitory computer readable storage medium having instructions stored thereon that, when executed by a processor in a controller, the instructions cause the controller to perform a method for processing indexed Digital Subscriber Line (DSL) data, wherein the method comprises:
- receiving a user data vector;
- receiving a set of indices and angles that identify data entries to be rotated from the received user data vector;

performing a 2×2 complex rotation of selected vector elements, wherein performing the 2×2 complex rotation comprises:
obtaining a first angle, a second angle, a first index and a second index from the set of indices and angles received,
obtaining a first original data entry from the indexed DSL data using the first index,
obtaining a second original data entry from the indexed DSL data using the second index,
obtaining a second original data entry from the indexed DSL data using the second index,
performing a complex rotation of the first original data entry and the second original data entry as follows:
applying a first real rotation using a first real rotation angle to a real part of the first and second original data entries resulting in a first complex output;
applying a second real rotation using the first real rotation angle to an imaginary part of the first and second original data entries, resulting in a second complex output;
applying a third real rotation using a second real rotation angle to the first complex output, resulting in the first rotated data entry complex output; and
applying a fourth real rotation using a third real rotation angle to the second complex output, resulting in the second rotated data entry complex output;
replacing the first original data entry with the first rotated Data entry in the indexed DSL data, and
replacing the second original data entry with the second rotated data entry in the indexed DSL data; and
repeating the receiving the set of indices and angles step and the performing the 2×2 complex rotation step until the 2×2 complex rotation is complete for a tone of the indexed DSL data.

18. The non-transitory computer readable storage medium of claim 17 wherein the indexed DSL data comprises data selected from the group comprising:
data used in a vectored DSL system communicably interfaced with the controller;
encoded user data being sent downstream in the vectored DSL system; and
received data being processed in a receiver communicably interfaced with the vectored DSL system.

19. The non-transitory computer readable storage medium of claim 17 wherein the 2×2 complex rotation implements a Q matrix, wherein the Q matrix is a pre-transmission unitary matrix, a Q* matrix, wherein the Q* matrix is a post-reception unitary matrix, or both the Q matrix and the Q* matrix.

20. The non-transitory computer readable storage medium of claim 17, wherein the controller repeats the method for each of a plurality of tones present in the indexed DSL data.

* * * * *